United States Patent [19]

Kamiguchi et al.

[11] Patent Number: 5,296,179
[45] Date of Patent: Mar. 22, 1994

[54] METHOD AND APPARATUS FOR MONITORING INJECTION PRESSURE

[75] Inventors: Masao Kamiguchi; Noriaki Neko, both of Oshino, Japan

[73] Assignee: Fanuc Ltd., Minamitsuru, Japan

[21] Appl. No.: 952,528

[22] PCT Filed: Apr. 7, 1992

[86] PCT No.: PCT/JP92/00431
§ 371 Date: Jan. 14, 1993
§ 102(e) Date: Jan. 14, 1993

[87] PCT Pub. No.: WO92/18317
PCT Pub. Date: Oct. 29, 1992

[30] Foreign Application Priority Data

Apr. 9, 1991 [JP] Japan ................................. 3-103379

[51] Int. Cl.⁵ ............................................. B29C 45/76
[52] U.S. Cl. ..................... 264/40.1; 364/476; 425/145; 425/149; 264/40.5
[58] Field of Search ............ 264/40.1, 40.5, 40.6, 264/328.1, 40.7; 425/145, 149, 162, 542; 364/476

[56] References Cited

U.S. PATENT DOCUMENTS

| | | | |
|---|---|---|---|
| 4,889,667 | 12/1989 | Kojima et al. | 264/40.1 |
| 4,911,629 | 3/1990 | Fujita | 264/40.7 |
| 5,013,231 | 5/1991 | Fujita et al. | 425/145 |
| 5,031,127 | 7/1991 | Fujita et al. | 364/476 |
| 5,035,598 | 7/1991 | Fujita et al. | 264/40.7 |
| 5,178,805 | 1/1993 | Yokota | 264/40.1 |
| 5,238,617 | 8/1993 | Kamiguchi et al. | 264/40.1 |

FOREIGN PATENT DOCUMENTS

| | | |
|---|---|---|
| 0478788 | 4/1992 | European Pat. Off. |
| 0525198 | 2/1993 | European Pat. Off. |
| 3809792 | 10/1988 | Fed. Rep. of Germany |
| 3839907 | 6/1989 | Fed. Rep. of Germany |
| 1-197214 | 9/1986 | Japan |
| 63-9522 | 1/1988 | Japan |
| 9113746 | 9/1991 | PCT Int'l Appl. |
| 9214598 | 9/1992 | PCT Int'l Appl. |

OTHER PUBLICATIONS

"Transfer Molding Apparatus," Osamu Yamauchi, Patent Abstracts of Japan, vol. 8, No. 76 (M-288) (1513), Apr. 9, 1984.
"Molding by Means of Injection and Compression Molding Machine and its Molding Device," Hideaki Okubo, Patent Abstracts of Japan, vol. 13, No. 560 (M-906) (3908), Dec. 13, 1989.

Primary Examiner—Jeffery Thurlow
Assistant Examiner—Mathieu Vargot
Attorney, Agent, or Firm—Staas & Halsey

[57] ABSTRACT

A method and an apparatus for monitoring injection pressure, using the relationship between positions of a screw (1), filling of resin in a cavity and injection pressure. Mold cavity data are stored, whereby a display screen (2) displays, based on said data, a configuration of the cavity and straight lines corresponding to cross sections along which the cavity is divided into a plurality of regions. Screw positions required to sequentially fill the divided regions of the cavity with the resin are obtained to be displayed on a coordinate axis representing a screw position in a pressure waveform graph (22). Then an operator changes the setting of molding conditions referring to the data on the display screen, and carries out the injection to obtain the pressure data corresponding to the screw position to be displayed on the pressure waveform graph (22).

7 Claims, 6 Drawing Sheets

| VOLUME | REGION | NUMBER OF LINES | COLOR | POINT |
|---|---|---|---|---|
| V0 | A LINE P01-P02 | L0 (=1) | C0 | P01, P02 |
| V1 | INSIDE A LINE P11-P12 | L1 (=1) | C1 | P11, P12 |
| V2 | INSIDE A LINE P21-P22 | L2 (=1) | C2 | P21, P22 |
| ⋮ | ⋮ | ⋮ | ⋮ | ⋮ |
| V5 | INSIDE TWO LINES P51-P52 AND P53-P54 | L5 (=2) | C5 | P51, P52 P53, P54 |
| V6 | INSIDE TWO LINES P61-P62 AND P63-P64 | L6 (=2) | C6 | P61, P62 P63, P64 |
| ⋮ | ⋮ | ⋮ | ⋮ | ⋮ |
| Vi | INSIDE Li LINES $P_{i,1} - P_{i,2}$ $P_{i,3} - P_{i,4}$ ⋮ $P_{i,2Li-1} - P_{i,2Li}$ | Li (=Li) | Ci | $P_{i,1}, P_{i,2}$ $P_{i,3}, P_{i,4}$ ⋮ $P_{i,2Li-1}, P_{i,2Li}$ |
| ⋮ | ⋮ | ⋮ | ⋮ | ⋮ |
| Vn-1 | INSIDE TWO LINES $P_{n-1,1} - P_{n-1,2}$ $P_{n-1,3} - P_{n-1,4}$ | Ln-1 (=2) | Cn-1 | $P_{n-1,1}, P_{n-1,2}$ $P_{n-1,3}, P_{n-1,4}$ |
| Vn | REMAINDER | — | Cn | — |

METHOD AND APPARATUS FOR MONITORING INJECTION PRESSURE

DESCRIPTION

1. Technical Field

The present invention relates to an injection molding machine having a screw for filling a resin into a mold cavity and controlled by, for example, numerical control, more particularly to an injection pressure monitoring method for simplifying the setting of molding conditions for injection molding and an apparatus for practicing the method.

2. Background Art

An injection molding machine is intended to mold products by injecting a resin material into a mold cavity using a screw. In general, the injection molding machine has a multistep injection speed control for changing the injection speed for various levels in response to a screw position. The injection speed must be set in consideration of the flow resistance of a resin, because the flow resistance varies depending on the regions through which the resin passes. Therefore, for the determination of the injection speed and a changeover position of the injection speed, the screw position corresponding to the state of resin being filled into the mold cavity must be properly grasped.

Conventionally, the short shot method has been used as a way of checking the state of resin being filled into the cavity. This short shot method comprises the steps of opening a mold after a small amount of injection of resin to check the amount of resin filled into the cavity, increasing the amount of the injected resin in sequence, finding screw positions where the flow resistance undergoes a change based on the resin position which has been filled into the mold, and determining the changeover position of the injection speed based on these screw positions.

As described above, in the short shot method, the amount of resin injected must be increased little by little, and the mold must be opened to check the position of the leading end of the resin filled into the mold every time the injection is executed, which is a time-and-labor-consuming work. Besides, the short shot method may not be applicable to some kind of molds, for example, for connectors, because the practicing of the short shot causes a part of the molded product to be left within such mold which may damage the mold. Furthermore, the practicing of the short shot may possibly prevent the molded product from being taken out of a type of mold. Moreover, an overfilling of the resin may disadvantageously take place (irrespective of the mold to be used) during the progress of the setting of the molding conditions by the short shot method.

DISCLOSURE OF THE INVENTION

It is therefore the object of the present invention to provide a method and an apparatus for monitoring an injection pressure capable of easily performing, for example, setting of injection conditions or change of the set injection conditions in view of positions where a resin within a cavity undergoes a change in flow resistance, by providing the operator with the graphically presented information concerning the relationship between an injection pressure and a screw position, a state of the resin being filled into the cavity and a position of the screw corresponding to the state, by way of the display of the injection pressure as well as a picture of the cavity on a display screen.

In order to achieve the above object, according to the first aspect of the present invention, a method of monitoring injection pressure applicable to an injection molding machine having a screw adapted to be propelled to fill a resin into a cavity of a mold comprises the steps of: storing in advance cavity data of the mold; displaying, based on the cavity data, a configuration of the cavity and divided regions obtained by dividing the cavity into a plurality of regions in a cavity display section provided on a display screen; detecting a screw position by a screw position detecting means while detecting an injection pressure at the screw position by a pressure detecting means; displaying in a graph a relationship between detected screw position and injection pressure in a pressure waveform display section provided on the display screen; and displaying a screw position region corresponding to the divided regions of the cavity being filled with the resin in a screw position region display section provided on the display screen, in comparison with a coordinate representing the screw position being displayed in the pressure waveform display section.

Preferably, a molding condition setting display section is further capable of displaying the molding conditions stored in a molding condition storage unit on a molding conditions setting display section on a display screen, and performing change of setting.

Also, items to be displayed in the molding condition setting display section are selectively changed through the operation of keys. The display screen further comprises a display area for plotting a cylinder of the injection molding machine, the display area located correspondingly to an axis of the coordinate representing the screw position in the graph representing the relationship between the screw position and the injection pressure, the display area displaying the screw displacement within the plotted cylinder by means of key operation, and the display area further including an operational condition display section for displaying a position of the displaced screw and/or a pressure value corresponding to the position.

More preferably, the divided regions of the cavity displayed in the cavity display section and the region of the screw position displayed in the screw position region display section are respectively colored with a color indicating their correspondence and capable of being distinguished from the other regions. The divided regions include those divided at the positions where the resin flowing within the cavity is subjected to a change in flow resistance.

According to the second aspect of the present invention, there is provided an apparatus for monitoring injection pressure, comprising: a screw for propelling a resin into a mold; a screw position detection means for detecting a position of the screw; and injection pressure detection means for detecting an injection pressure of the resin produced by the screw; a numerical control means for numerically controlling the screw; a cavity data storage unit which in advance stores cavity data of the mold; and a display section for displaying a configuration of the cavity and divided regions of the cavity defined by dividing the cavity into a plurality of regions based on said cavity data; a pressure waveform display section for displaying a relationship between the screw position detected by the screw position detection means and the injection pressure detected by the pressure detection means; and a screw position region display section for displaying a region of a screw position corresponding to divided regions being filled with the resin in comparison with a coordinate representing a screw position in the pressure waveform display section.

The display screen for monitoring the injection pressure displays an injection pressure graph corresponding to detected screw positions, and plots a configuration of the cavity and divided regions obtained by dividing the cavity into a plurality of regions. The display screen further produces a display indicating a screw position region required to sequentially fill the divided regions of the cavity, on a coordinate axis representing screw positions in a graph showing a waveform of the pressure.

Through the reference to the screw position for the finding of molding conditions and the like, and to the pressure waveform after the completion of the trial injection, the molding conditions such as injection speed changeover position can be easily set.

Additionally, this screen allows not only the molding conditions to be set, but also current molding conditions to be displayed.

According to the present invention as described above, the graph representing the injection pressure is displayed together with the picture of the cavity on the screen, and the regions obtained by dividing the mold cavity are displayed correspondingly to the regions of the screw positions in the graph showing the pressure waveform, and hence the relationship between the injection pressure and the screw position, and a relationship among the screw position and state of resin being filled into the cavity and injection pressure can be easily grasped in view of the display screen, thereby enabling an easy setting of molding conditions. Furthermore, the setting of the molding conditions can be done through the screen displaying the above items.

A number of novel features of this invention are fully pointed out in the claims constituting a part of this description. For the better understanding of this invention in terms of its functional advantages and the objects to be accomplished through its execution, reference should be made to the accompanying drawings illustrating preferred embodiments of the present invention as well as the description thereof.

BRIEF DESCRIPTION OF DRAWINGS

FIG. 3 is an explanatory drawing showing a table of cavity data for storage;

BEST MODE FOR CARRYING OUT THE INVENTION

Figure 1:
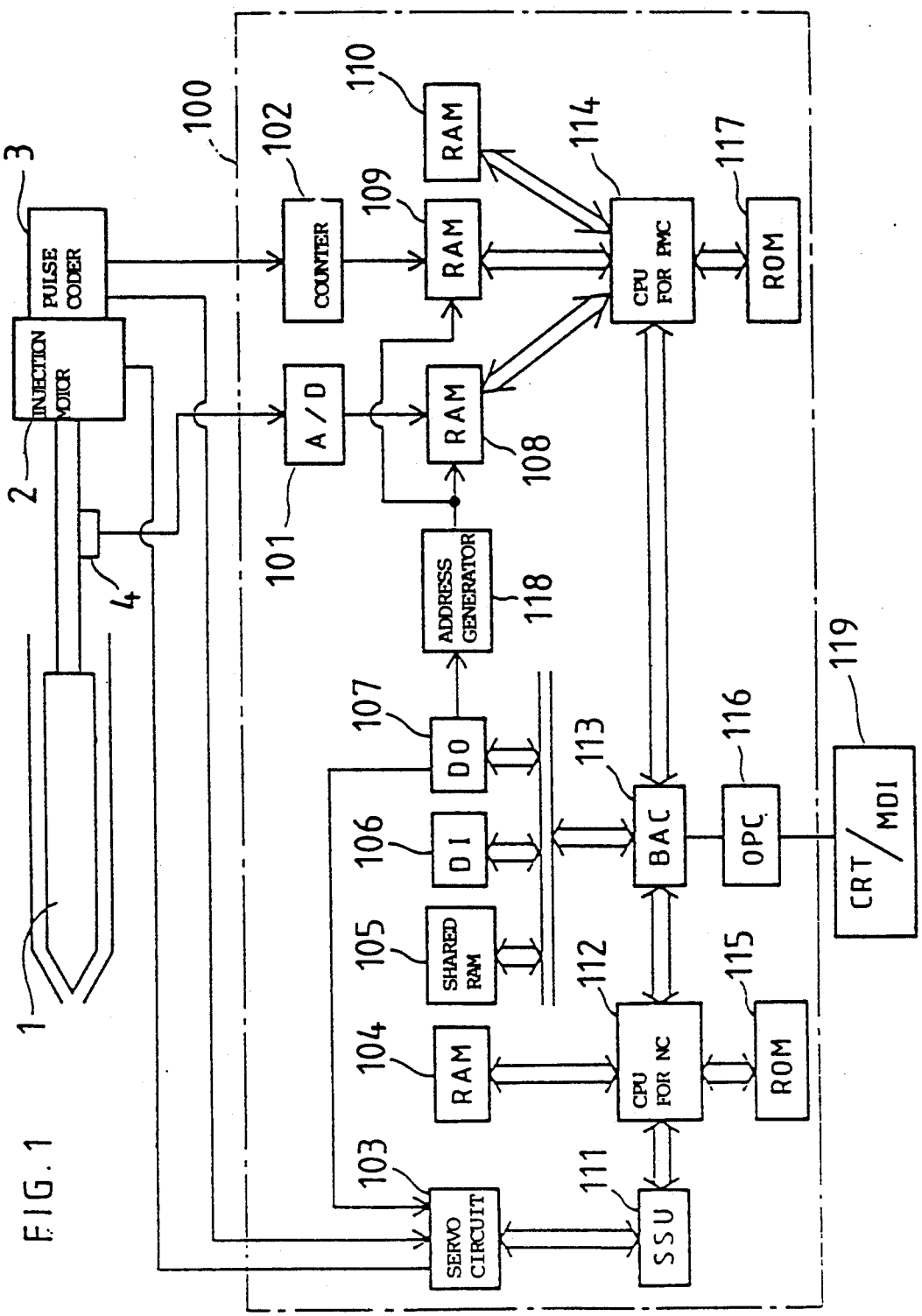
FIG. 1 is a block diagram showing a principal part of an injection molding machine for practicing a method of the present invention.

FIG. 1 depicts an electrically-operated injection molding machine employing an embodiment of the present invention, and a principal part of a control system thereof. Reference numeral 1 denotes a screw, and reference numeral 2 an injection servo motor for axially driving the screw 1. The injection servo motor 2 is provided with a pulse coder 3 intended to detect a current position of the screw 1, while the screw 1 is provided with an injection pressure sensor 4 for detecting a resin pressure by virtue of a reaction force which acts in the axial direction of the screw.

A numerical control system (referred to as an NC system hereinafter), denoted by reference numeral 100, for controlling the injection molding machine comprises a micro processor (referred to as a CPU hereinafter) 112 for NC, and a CPU 114 for a programmable machine controller (referred to as a PMC hereinafter). The CPU 114 for the PMC is connected to a ROM 117 which stores, for example, a sequence program for controlling a sequential operation of the injection molding machine, and a RAM 110 for the PMC. The CPU 112 for NC is connected to a ROM 115, which stores a control program for generally controlling the injection molding machine, and to servo circuits 103, which drivingly control corresponding servomotors associated with axes for injection, clamping, screw rotation, an ejector and the like respectively, through a servo interface 111. It is to be noted that only a servo circuit 103 associated with the injection servo motor 2 is shown in FIG. 1 among such servo circuits.

Furthermore, a nonvolatile shared RAM 105 constituted of a bubble memory or a CMOS memory includes a memory section which stores, for example, an NC program for controlling actions of the injection molding machine, and a setting memory section which stores a variety of set values, parameters, and macro variables. A bus arbiter controller 113 (referred to as a BAC hereinafter) is connected to buses, respectively, of the CPU 112 for NC, the CPU 114 for the PMC, the shared RAM 105, an input circuit 106, and an output circuit 107, thereby controlling the buses to be used.

Additionally, a manual data input unit 119 with a CRT display (referred to as a CRT/MDI hereinafter) is connected via an operator panel controller 116 to the BAC 113 to display various setting screens or working menus on a CRT display or to perform an input of various setting data or a selection of the setting screen to be displayed through the operation of control keys such as a soft key or a ten key. Moreover, a RAM 104, which is connected through a bus to the CPU 112 for NC, is utilized for temporary storage of data or other applications.

The aforementioned servo circuit 103 is connected to the injection servo motor 2, and receives an output from the pulse coder 3. Furthermore, the servo circuit 103 receives from the output circuit 107 a torque limit value for controlling an output torque of the injection servo motor 2.

The output circuit 107 is further connected to an address generator 118 whose output is inputted to RAM's 108 and 109 which are connected through buses to the CPU 114 for the PMC to designate the same address in the RAM's 108 and 109. The RAM 108 is connected through an A/D converter 101 to the injection pressure sensor 4 to receive signals therefrom, while the RAM 109 is connected to a counter 102 which counts signals transmitted from the pulse coder 3 to detect a screw position. Thus, when the output circuit 107 issues an injection start instruction, the address generator 118 generates addresses in sequence by a predetermined sampling period from a predetermined address, and designates the same address in the RAM's 108 and 109 to store the outputs of the A/D converter 101 and the counter 102 into the designated address.

FIG. 1 illustrates members only associated with an injection axis, that is, the injection servo motor 2, which drives the screw 1 for injection, and the pulse coder 3, which is mounted on the injection servomotor 2 and detects the rotation of the servomotor to detect a screw position, with the other members not shown associated with other axes such as closing axis, a screw rotating axis, and an ejector axis. Also, for the servo circuits of the NC system 100, only that of the injection servo motor is shown, and the servo circuits for the other axes are omitted.

The NC system 100, having the above-described configuration according to the present invention for controlling the injection molding machine, is similar to the conventional system as far as the CPU for 112 for NC distributes pulses via servo interface 111 to each of servo circuits 103, corresponding to various axes of the molding machine, while the CPU 114 for the PMC performs a sequential control in accordance with an NC program stored in the shared RAM 105 and the above-described various molding conditions or a sequence program stored in the ROM 117.

Figure 2:
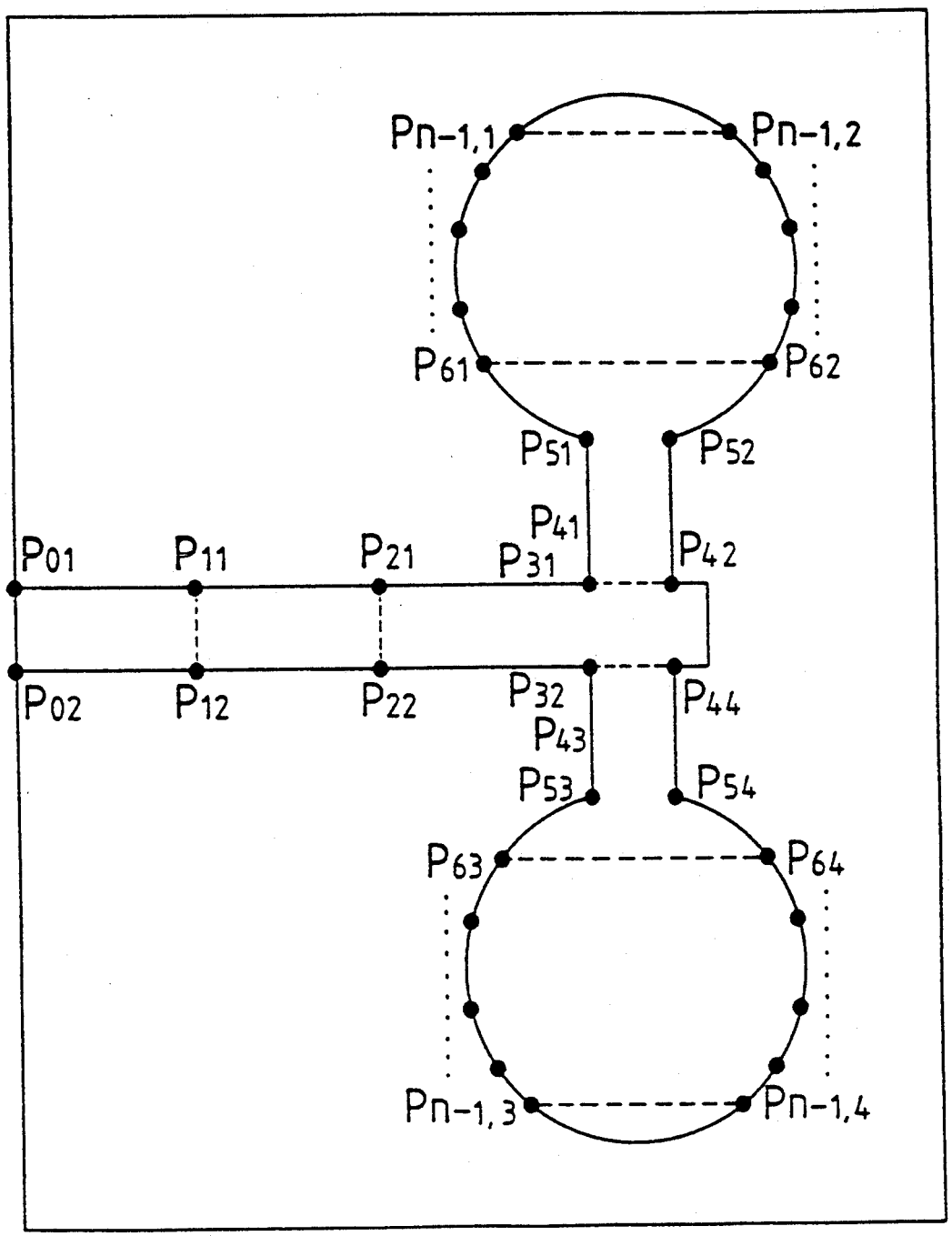
FIG. 2 is an explanatory drawing showing a plotted picture of a mold cavity.

According to the present invention, however, cavity data are stored in the shared RAM 105. Incidentally, the mold is usually designed by CAD system or the like. Thus, when executing the mold design, a diagram representing the cavity, that is, a picture illustrating a longitudinal sectional view (or the contour) of the cavity is prepared as shown in FIG. 2 for example, while a table TB for storing the cavity data is prepared as shown in FIG. 3, and the prepared data are stored in the shared RAM 105. More specifically, volumes (V0, V1, V2, ... Vn) of regions obtained by dividing the mold cavity and then adding all the volumes of divided regions which the resin passes to reach the region concerned, the number of lines (L0, L1, L2, ... Ln) corresponding to sections necessary to display the above-mentioned divided regions within the plotted cavity, points (P01, P02; P11, P12; P21, P22; ...) lying on the cavity contour to be connected by such lines as were described above, and colors (C0, C1 ... Cn) for distinguishing these divided regions are entered within a table TB to be stored, and these cavity data are stored in a floppy disk or the like. A disk controller is then connected to an operator panel controller 116 so that these cavity data are stored from the floppy disk to the shared RAM 105 by way of the disk controller. At the same time, pictures of the cylinder and the screw are also inputted into the shared RAM 105.

Further description will be given as to FIG. 2, which shows an image of the actual mold cavity displayed as a sectional view on the screen. A plurality of points for diving the volume of the cavity into several regions are designated on the contour line. These points correspond to the "points" in the table TB of FIG. 3. The following description will be made of these points, which are selected to represent positions where the flow resistance of the resin flowing within the cavity shows a conspicuous change such as those where the front end of the resin flowing within the cavity is forced to turn acutely or the sectional area through which the resin passes changes extremely. In the case of FIG. 2, for example, such positions correspond to point P31 (=P41), points 32 (=P43), P42, P44, and P51 to P54. Furthermore, points (P11, P12, P21, P22, for example) may be selected for appropriately dividing regions between these points or between the start points P01 and P02 and the above-mentioned other points. The total number of the regions to be divided for the cavity should be determined, in view of the fact that the more the number of the regions to be divided, the more finely the state of the resin being filled into the cavity is represented. The volumes of the regions to be divided may each have substantially the same volumes, or alternately the vicinity of the points where the flow resistance greatly changes may be divided finer than the other regions.

The table TB in FIG. 3 instructs where the cavity plotted on the screen as is shown in FIG. 2 is to be divided and how the divided regions are colored. Moreover, this division and divided regions are numbered in an order in which the resin flows in through the entrance (P01–P02) and advances to the far side. In the case where the resin which has flowed in diverges in two or more directions, the cavity is divided by a plurality of sections where the front ends of the resin reach at the same time. It should be noted that the "volume" in the table TB in this figure represents a total value (therefore, the entire volume of the cavity V=Vn).

For example, assuming that the resin has been filled into the cavity up to the volume V6, FIG. 3 indicates that the resin has reached lines joining the points P61 and P62, and the points P63 and P64 with respect to the cavity in FIG. 2. Accordingly, these points P61 and P62, and P63 and P64 are sets of the points defining the sections by which the cavity is divided. It also indicates the number of the lines to be joined as L6=2. Moreover, the volumes of divided regions represented as V6–V5, that is, the volume of the region defined by the line joining the points P61 and P62 and a line joining the points P51 and P52; and the volume of the region defined by the line joining the points P63 and P64 and a line joining the points P53 and P54 (they are separated from each other) are considered herein as the regions to be filled at the same time, and colored with a particular single color (C6) for being distinguished from the other regions.

Figure 4:
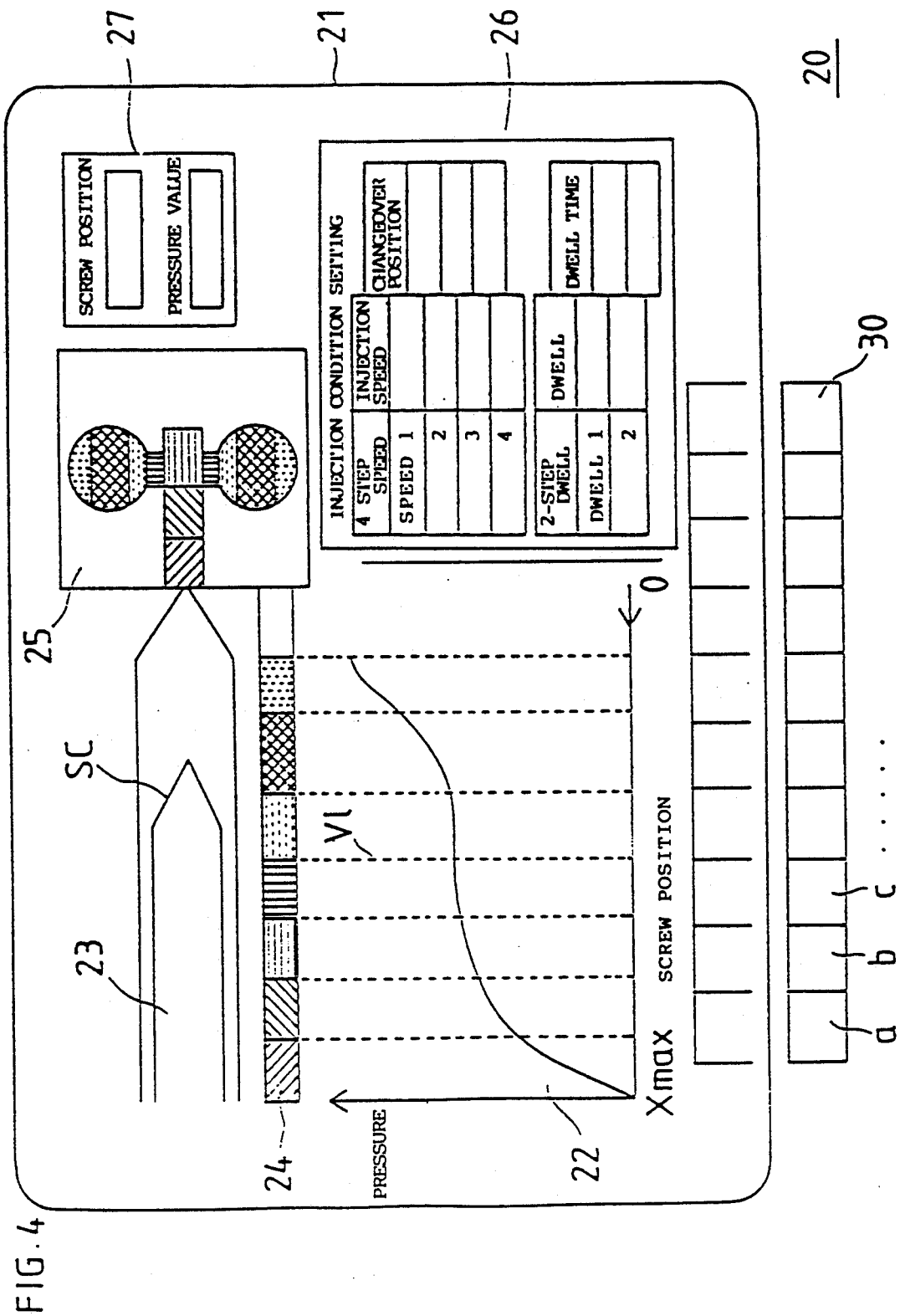
FIG. 4 is an explanatory drawing showing a display screen to be used and displayed in practicing the method of the present invention.

FIG. 4 illustrates an example of a picture to be displayed on an injection pressure monitoring screen (or a display screen 21). On the left side of the display screen 21 of the CRT display 20 of the CRT/MDI 119, there appear an area 22 showing a graph of a pressure waveform with the abscissas representing screw positions and the ordinate representing pressure values, an area 23 showing a picture of the cylinder and screw which is plotted correspondingly to the length of the abscissa representing the screw positions, and an area 24 showing a bar graph for color display of the screw positions necessary to sequentially fill the divided regions in the cavity with resin and corresponding to the screw position coordinates of the pressure waveform graph.

On the other hand, the screen 21 displays on its right side an area 25 showing a picture of the cavity, and an area 26 of molding condition setting display section for selectively displaying the various molding conditions such as injection condition. On the right of the area 25 showing a picture of the cavity, there is provided a column 27 representing a screw position and corresponding pressure at the time when the cylinder in the area 23 showing the cylinder and screw is displaced through the operation of the keys described later.

The CRT display 20 further includes soft keys 30 designated in FIG. 4 at a, b, c . . . .

Figure 5:
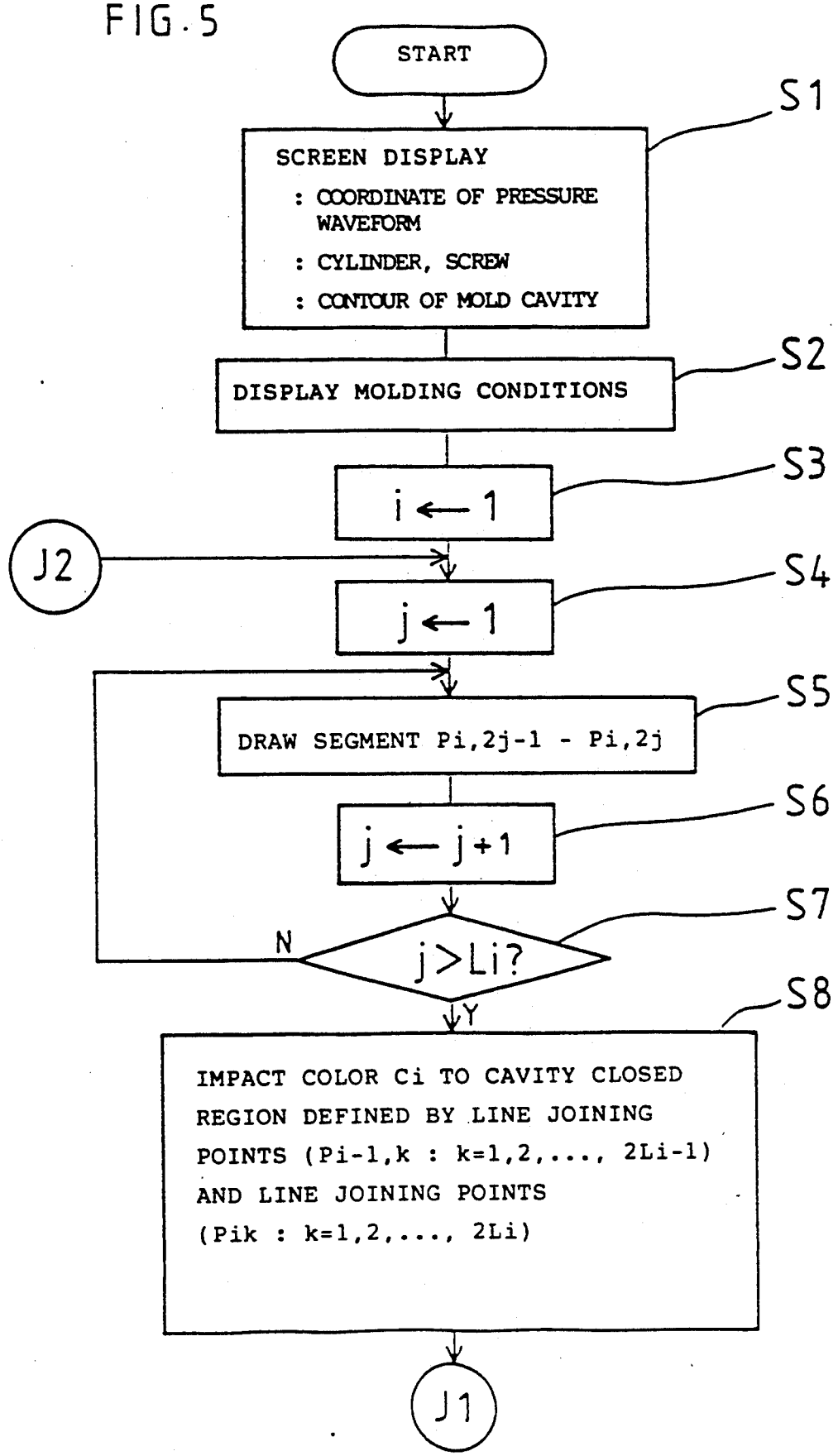
FIG. 5 is a (partial) flowchart of a processing performed in a first embodiment of the present invention.
Figure 6:
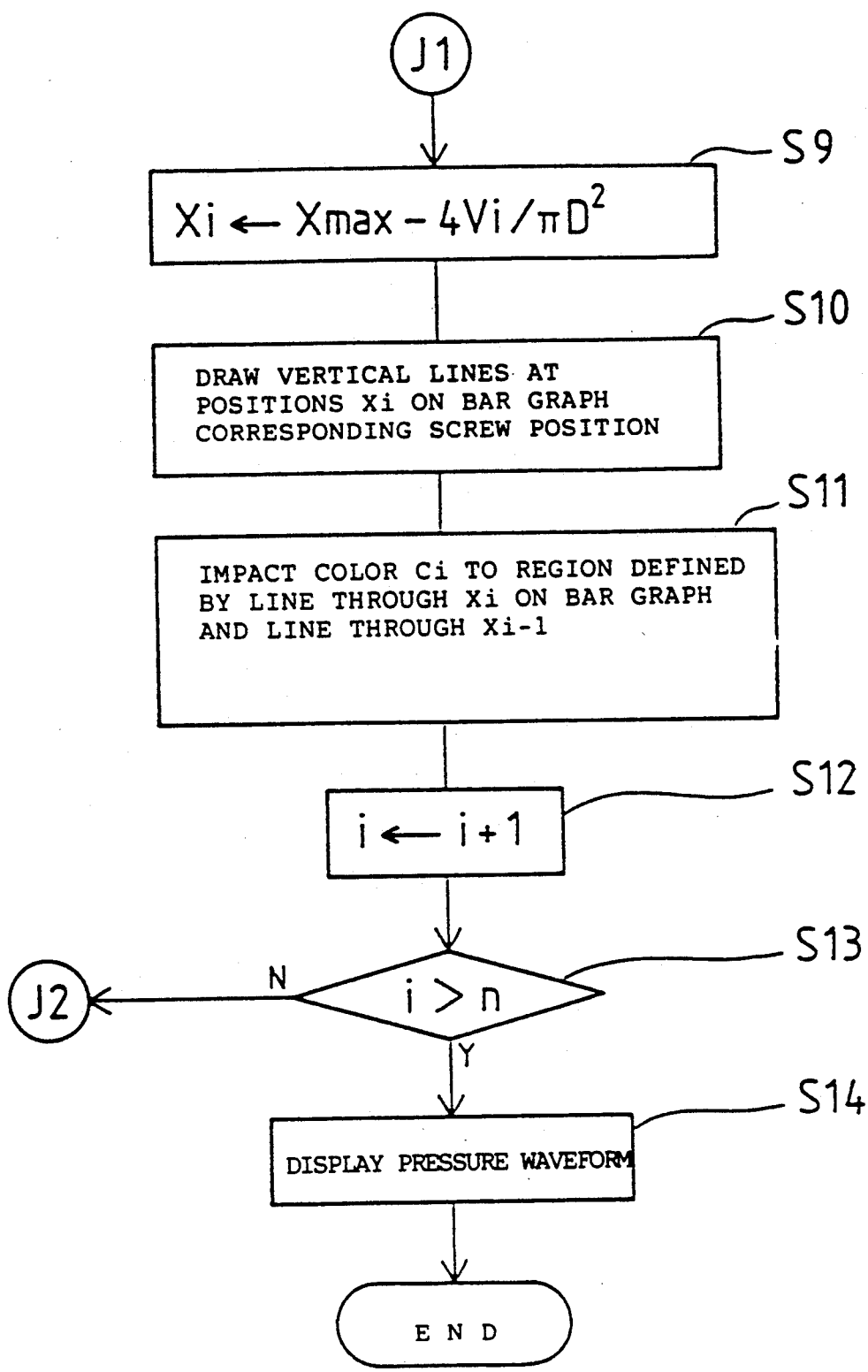
FIG. 6 is a flowchart following the flowchart shown in FIG. 5.

An example of monitoring with this CRT display used as a monitor screen will now be described with reference to flowcharts shown in FIGS. 5 and 6.

Firstly, when an monitoring instruction is inputted, the CPU 114 for the PMC plots on the screen 21 of the CRT display 20 the coordinates for displaying the pressure waveform with the abscissa representing screw positions and with the ordinate representing pressure values, a picture sc of the cylinder and the screw resting on a screw back position (Xmax) within this cylinder, and a picture of the sectional contour of the mold cavity (Step S1), based on the data stored within in the shared RAM 105.

In this case, the screw back position is one which has already been stored in the condition setting and storing section. However, when the mold is changed, the screw back position should be first set. When the mold is changed, an amount of screw stroke derived from the entire volume of the cavity (Vn) is to be displayed, and the screw back position should be set based on this stroke.

The CPU 114 for the PMC displays, on the area 26 for displaying the molding conditions, data associated with the molding conditions currently selected from among the molding conditions stored within the setting condition storage section of the shared RAM 105. In the example shown in FIG. 4, the injection condition is selected as the molding condition to be displayed. Hence, in this case, the CPU 114 for the PMC calls setting data associated with the injection and hold stored in the shared RAM 105 for the display on the display area 26 (Step S2). Matters to be displayed on the display area 26 includes a temperature, metering condition, clamping condition and ejector setting.

Then, an index i representing a number of the region (divided volume) is set to 1 (Step S3), and an index j representing a number of the point at which the cavity is divided is also set to 1 (Step S4).

Furthermore, with respect to the contour of the cavity plotted in the display area 25 of the display screen 21, points Pi, 2j−1 and Pi, 2j are joined by a line (Step S5). Besides, at the start of molding, as j equals 1, the points Pi1 and Pi2 are joined by a line (note that points P01 and P02 are assumed to have been stored in advance in the shared RAM 105 as a part of the cavity contour data).

Afterwards, the index j is incremented by 1 to obtain new j (Step S6), and it is judged whether the new j is less than the number Li of the lines stored in the table TB corresponding to that volume Vi (refer to FIG. 3). In other words, it is judged whether there are any other lines left for joining other points except the line joining the Pi1 and Pi2 (Step S7). Providing that the number of the lines (L5, L6) of V5 and V6 is 2 as shown in the table TB in FIG. 3, the procedure returns from Step S7 to Step S5 once to join the points Pi, 2j−1 and Pi, 2j, that is, the points Pi3 and Pi4 with a line.

In this manner, when it is judged that the value of the index j is equal to the number Li of the lines in the table TB, a closed region, which is defined by a line drawn in Step S5 at the value i of the current index, a line drawn in Step S5 at the preceding value i−1 of index i and the contour of the cavity, is colored with a predetermined color Ci, which has been determined in the table TB in FIG. 3 (Step S8). Different colors are assigned to V1 to Vn (for example, colors gradually changing from red to blue). For example, when i=6 in Step S6, segments P61-P62 and P63-P64 are drawn on the picture of the cavity in Step S5. In the next Step S8, a closed region (with a volume corresponding to V6-V5) defined by these lines, a line drawn in Step S4 with i=5, that is, segments P51-P52 and P53-P54, and cavity contour is colored with a color C6 designated in the table TB.

In this manner, when the division of the cavity and coloring of thus divided regions are completed, a screw position, at which the cumulative volume Vi of the present region including preceding regions in the cavity can be filled with resin, is found (Step S9). This screw position is defined by the position of the extremity of the cylinder on a coordinates, in which the extremity of the cylinder is correspondent to the origin (0), and the screw back position is represented as Xmax. Thus a screw position Xi corresponding to the volume Vi is expressed as:

$$Xi = X\max - [4Vi/D^2]$$

When the screw position Xi corresponding to the divided volume Vi is determined for i=0 to n, respectively, vertical lines vl (broken lines in the example shown in FIG. 4) are displayed respectively at the corresponding screw positions Xi (coordinate values) on the abscissa of the pressure waveform graph (Step S10). These vertical lines vl are extended upward (that is, in the direction parallel with the ordinate) to pass through the area 24 for displaying the bar graph located beneath the area 23 for displaying the cylinder and screw. A portion of the bar graph, which is defined by the above-described vertical line vl and a vertical line vl drawn at the screw position Xi−1 corresponding to the previously determined divided volume Vi−1, is colored with the same color as the color Ci used to color the present division regions in the cavity (Step S11).

When the index i representing numbers of these regions (divided volumes) is incremented by one (Step S12), and judged that the value of this index i has not reached a value (n), the final number of the regions, the procedure returns to the Step S4 to repeat the same processing for the next divided region.

Whereas, when it is judged that i=n+1, that is, the processing for all the regions has been completed, the cavity plotted on the display screen 21 is divided into n regions, each filed with different colors for identification. At the same time, a plurality of n vertical lines appear on the graph of the pressure waveform, while the bar graph displayed correspondingly to the abscissa (screw positions) is also divided into n regions to be respectively filled with colors corresponding to those used to fill the regions of the cavity.

Therefore, by viewing these vertical lines vl on the pressure waveform graph and the colors of the bar graph in the area 24, the operator can easily know the screw position where the flow resistance varies in the cavity. As a result, the setting of the molding conditions, in particular, that of the injection condition can be changed with ease by viewing this screen.

Then, the CPU 114 for the PMC calls the data of the pressure values corresponding to the screw positions, which are stored synchronously with the RAM's 108 and 109 to display it on the pressure waveform graph of the screen 21 (Step S14). It should be noted, however, that, when a mold is replaced by a new one, the data of the previous mold, which has been stored, will be displayed.

Furthermore, in the case where the display screen 21 displays at one time (in other word, overwrites) pressure data obtained each time injection is continuously carried out under the same mold and the same molding conditions so as to monitor the injection pressure, the data of the pressure and screw position may be read from the RAM's 108 and 109 each time dwell completion signals are issued, to thereby perform the processing at the Step S14 and overwrite the pressure waveform, in stead of immediately terminating the entire processing after obtaining the first injection data for the pressure display at the Step S14.

In this case, the setting of the molding conditions can be done using this screen. More specifically, as the area 26 for displaying molding conditions is in the form the window, a variety of molding conditions can be selectively displayed in this area 26 by selectively manipulating the soft keys corresponding to the items of the molding conditions.

Here will be explained as to the case, where the injection condition as one of the molding conditions is set using this display screen. In this case, the soft key for displaying the injection condition is first operated to display the injection condition in the area 26 as shown in FIG. 4. The injection condition to be displayed in this area 26 is derived from the injection condition data stored in the shared RAM 105 (FIG. 4 illustrates an example in which the number of the speed changeover steps is four, and the number of dwell steps is two).

For setting the injection condition, a cursor is first moved to a position of an item for which the displayed numerical value is to be changed by manipulating a cursor key of the CRT/MDI 119, and a numerical value to be newly set is inputted through the ten key.

First, when the number of steps of speed change has to be altered, the cursor is moved to the position of the item representing the number of steps of the speed among the items of the injection conditions displayed in the area 26, and the newly set number of speed change step is inputted through ten keys. Then, a table (an input column) corresponding to the set number of speed change steps is created and displayed in this area 26. After this input, the cursor key is used to move the cursor to an item subjected to the next setting change, in other words, a position of changeover, for example, from the first step speed to the second step speed of thus created table displayed in the area 26. In this manner, the setting of the changeover position from the first step speed to the second step speed is ready to be performed by the operation of the cursor key.

Then, the operator moves the picture sc of the screw in the display area 23 by operating a key constituting the soft keys 30 and for moving the picture sc of the screw while taking into account the vertical lines vl of the pressure waveform graph of the screen 21 and the colors of the bar graph in the area 24. In response to the operation of the soft key, a screw position at that time is numerically displayed in a screw position displaying section of the display area 26. Then the operator refers to a positional relationship between the extremity of the picture sc of the screw and the vertical lines vl, and the divided region of the cavity colored with the same color as that of the bar graph in the display region 24 immediately below the extremity of the picture sc of the screw, while taking into account the state of filling at that time, to select the changeover position of the first step. Furthermore, referring to the numerical value of the screw position displayed in the area 27 at the time of this selection, the changeover position from the first-step speed to the second step-speed is numerically input by way of the ten key. The setting of the screw position for change from the first-step speed to the second-step speed can thus be accomplished. Simultaneously with this setting, the set value is stored in the shared RAM 105.

Next, the cursor is moved to a position of an item subjected to the next setting change by use of the cursor key to repeat the same operations as described hereinbefore. Such a series of operations are to be executed for all items requiring the change of setting, thus completing the setting of the injection condition.

Then, other setting conditions can also be displayed in the area 26 by operating the soft key, and such conditions can be set by the same procedure as that performed for setting the injection condition.

After the setting of the molding conditions in this manner, a trial injection is carried out. Then, a monitoring instruction is inputted so that the pressure value data corresponding to the screw position, which are sychronously stored in the RAM's 108 and 109 as the result of the trial injection, is called by the CPU 114 for the PMC for display on the pressure waveform graph of the screen 21.

Taking into account this pressure waveform, the picture of the cavity, vertical lines vl and bar graph, the operator may somewhat to and fro displace the speed changeover position for the reset thereof. This setting can also be performed by the use of the display area 26 of the screen 21. Then, the injection is performed again under the same condition so that the result can be displayed on the pressure waveform graph of the screen 21 in the same manner as is described above. In this case, the pressure waveform obtained in the previous injection may be left on the screen without clearing so that the preceding waveform can be compared with the present waveform, thereby ensuring an easy grasp where and how the change of the conditions brings about the change in the pressure value. Incidentally, only the color of the waveform associated with the latest injection may be differentiated from those of the waveforms associated with the preceding injections, thereby distinguishing the waveforms associated with the preceding injections from the waveform associated with the latest injection based on the colors of the waveforms.

Furthermore, when the injection condition is newly set on the screen 21, the set values (a changeover position, an injection speed, etc.) may be displayed using a particular color on the pressure waveform graph. In this case, it should be noted that the ordinate is switched to represent the injection speed.

Moreover, in the screen 21 shown in FIG. 4, the position of the front end of the picture of the screw in the display area 23 can be changed in lateral direction by operating the soft key, corresponding to the abscissa (representing the screw position) of the pressure waveform graph located immediately below. When the position of the picture of the screw is displaced, the position is numerically displayed in the column for the screw position in the serial display area 27, while the pressure value corresponding to the position is also numerically displayed in the column for the pressure in the same area 27. Therefore, the operator can easily observe how far the pressure has increased in the vicinity of the speed changeover position corresponding to the screw position, or the screw position where an abrupt change in pressure has occurred. For the setting of the conditions in particular, the numerical display of the screw position may advantageously lead to a strict setting of the speed changeover position.

Furthermore, this embodiment may be varied so that the cursor can be displaced along the abscissa (which is a coordinate axis representing the screw position) of the pressure waveform graph corresponding to the displacement of the picture of the screw. In addition, the graphically divided regions of the cavity to be graphically filled with the resin by moving the picture sc of the screw may be filled with a single particular color in order to be distinguished from the other divided regions which are not filled with the resin.

The present invention can be embodied in a variety of forms without departing from the essential characteristic thereof, and hence the above-described embodiments are solely for illustrative purpose only and are not intended to be restrictive. Additionally, the scope of the invention is defined by the appended claims, not by the description preceding the claims, and accordingly, all the modifications within requirements of the claims and the equivalents to the requirements should be covered by the claims.

What is claimed is:

1. A method of monitoring injection pressure applicable to an injection molding machine having a screw adapted to be propelled to fill a resin into a cavity of a mold, said method comprising the steps of:
   (a) storing in advance cavity data of said mold;
   (b) displaying, based on said cavity data, a configuration of said cavity and divided regions obtained by dividing said cavity into a plurality of regions in a cavity display section provided on a display screen;
   (c) detecting a screw position by a screw position detecting means while detecting an injection pressure at said screw position by a pressure detecting means;
   (d) displaying in a graph a relationship between detected screw position and injection pressure in a pressure waveform display section provided on said display screen; and
   (e) displaying a screw position region corresponding to said divided regions of said cavity being filled with the resin in a screw position region display section provided on said display screen, in comparison with a coordinate representing said screw position being displayed in said pressure waveform display section.

2. A method of monitoring injection pressure according to claim 1, further comprising a step of:
   displaying molding conditions stored in a molding condition storage unit on a molding condition setting display section on said display screen, and performing a change of setting.

3. A method of monitoring injection pressure according to claim 2, wherein items to be displayed in said molding condition setting display section are selectively changed over through the operation of keys.

4. A method of monitoring injection pressure according to claim 1, wherein
   said display screen further comprises a display area for plotting a cylinder of said injection molding machine; said display area is located correspondingly to an axis of the coordinate representing said screw position in the graph representing the relationship between said screw position and said injection pressure; said display area displays said screw displacement within said plotted cylinder by means of key operation; and said display area further includes an operational condition display section for displaying a position of said displaced screw and/or a pressure value corresponding to said position.

5. A method of monitoring injection pressure according to claim 1, wherein
   said divided regions of said cavity displayed in said cavity display section and the regions of said screw position displayed in said screw position region display section are respectively colored with a color indicating their correspondence and capable of being distinguished from the other regions.

6. A method of monitoring injection pressure according to claim 1, wherein said divided regions include those divided at the positions where the resin flowing within said cavity is subjected to a change in flow resistance.

7. An apparatus for monitoring injection pressure, comprising:
   a screw for propelling a resin into a mold;
   a screw position detection means for detecting a position of said screw;
   an injection pressure detection means for detecting an injection pressure of the resin produced by said screw;
   a numerical control means for numerically controlling said screw;
   a cavity data storage unit which in advance stores the cavity data of said mold; and
   a cavity display section for displaying a configuration of said cavity and divided regions of the cavity defining said cavity into a plurality of regions based on said cavity data; a pressure wave form display section for displaying in a graph a relationship between the screw position detected by said screw position detection means and the injection pressure detected by said pressure detection means; and
   a screw position region display section for displaying a region of a screw position corresponding to divided regions being filled with the resin in comparison with a coordinate representing a screw position in said pressure waveform display section.

* * * * *